United States Patent [19]
Thompson

[11] Patent Number: 5,340,028
[45] Date of Patent: Aug. 23, 1994

[54] ADAPTIVE MICROPROCESSOR CONTROL SYSTEM AND METHOD FOR PROVIDING HIGH AND LOW HEATING MODES IN A FURNACE

[75] Inventor: Kevin D. Thompson, Indianapolis, Ind.

[73] Assignee: Carrier Corporation, Syracuse, N.Y.

[21] Appl. No.: 90,340

[22] Filed: Jul. 12, 1993

[51] Int. Cl.⁵ .............................................. F24D 5/00
[52] U.S. Cl. .................................... 236/10; 236/46 E
[58] Field of Search ................ 236/10, 11, 1 E, 1 EA, 236/1 EB, 46 R, 46 E, 46 F, 15 BG, 9 R

[56] References Cited

U.S. PATENT DOCUMENTS

| | | | |
|---|---|---|---|
| 4,356,962 | 11/1982 | Levine | 236/11 |
| 4,425,930 | 1/1984 | Kruto | 131/1 |
| 4,638,942 | 1/1987 | Ballard | 236/10 |
| 4,667,874 | 5/1987 | Johnson et al. | 236/46 E X |
| 4,725,001 | 2/1988 | Carney et al. | 236/11 |
| 4,887,767 | 12/1989 | Thompson | 236/1 EB |
| 4,907,737 | 3/1990 | Williams | 236/11 |
| 4,938,684 | 7/1990 | Karl et al. | 236/46 F X |
| 4,982,721 | 1/1991 | Lynch | 126/116 A |
| 5,027,789 | 7/1991 | Lynch | 126/116 A |
| 5,197,664 | 3/1993 | Lynch | 236/11 |

*Primary Examiner*—Harry B. Tanner

[57] ABSTRACT

A method for providing a low fire mode and a high fire mode of a heating cycle in a current cycle of a furnace as a function of the previous heating cycle wherein the current heating cycle is a function exclusively of time run in low fire mode and time run in high fire mode of the previous heating cycle, comprising the steps of: (1) determining the existence of a heating load to be satisfied; (2) running burners in low fire mode for a first time interval that does not exceed a predetermined limit, $L_{des}$; (3) running the burners in high fire mode for a second time interval until the heating load is satisfied; (4) calculating a BtU load requirement, as a function of the first time interval and the second time interval; and (5) determining the desired low fire mode time limit, $L_{des}$, for the next cycle from the calculated BtU load requirement.

14 Claims, 12 Drawing Sheets

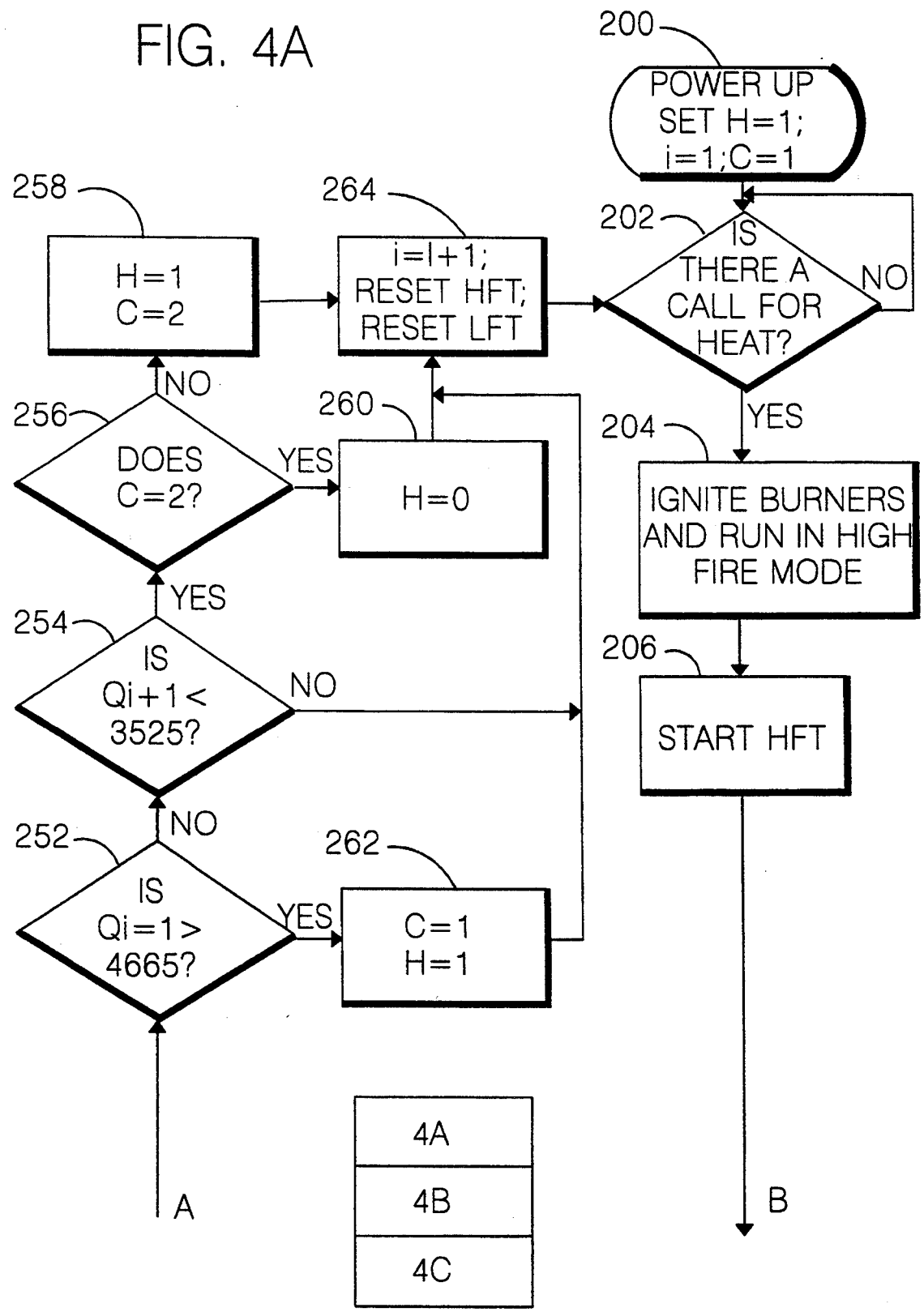

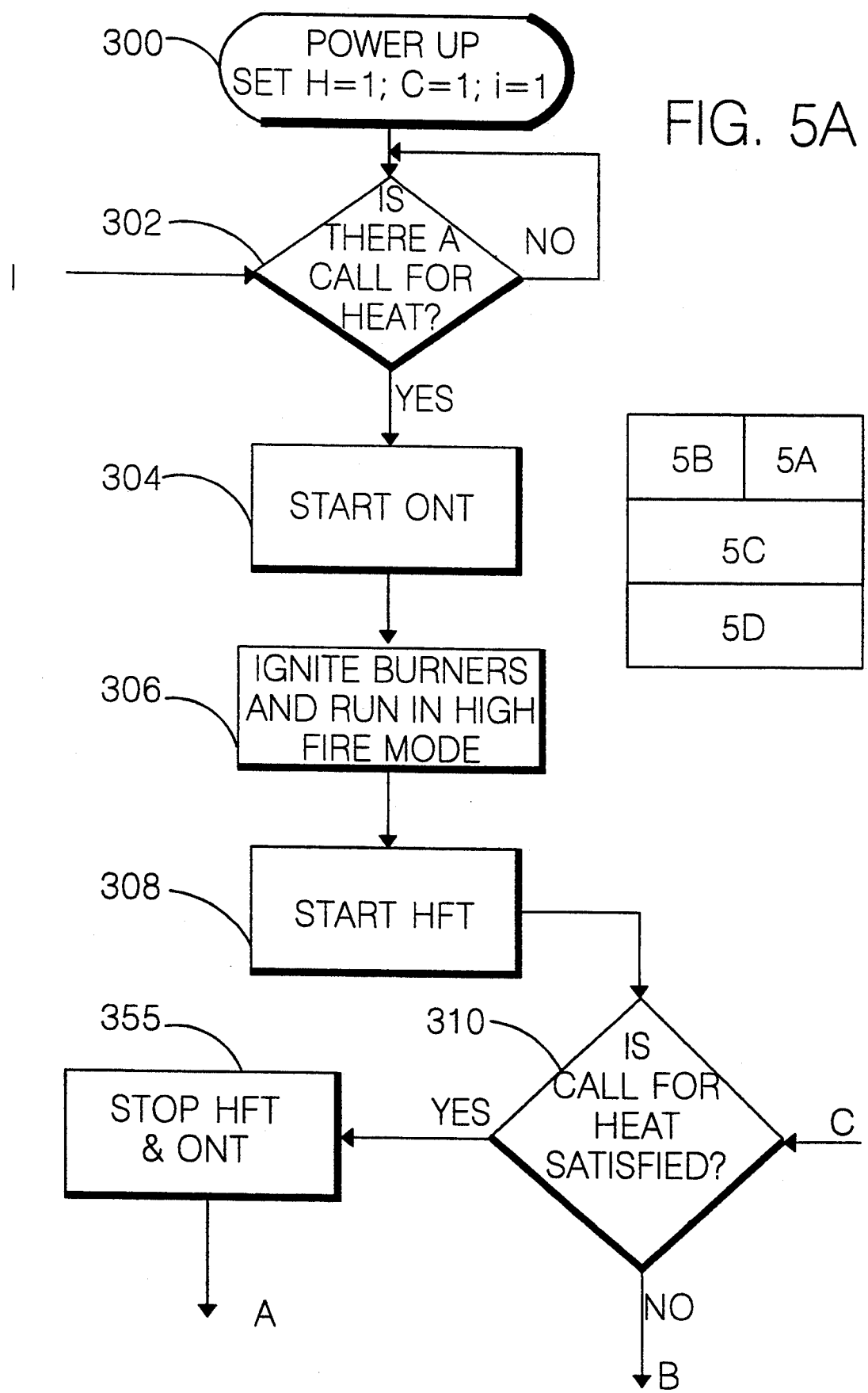

ADAPTIVE MICROPROCESSOR CONTROL SYSTEM AND METHOD FOR PROVIDING HIGH AND LOW HEATING MODES IN A FURNACE

BACKGROUND OF THE INVENTION

The present invention pertains to furnaces, and more particularly to a microprocessor control system and method for providing high and low heating rates in a furnace utilizing a single stage thermostat.

Presently, many furnace controls include a two-stage thermostat for providing dual rate heating, wherein the first stage of the thermostat operates the furnace on low heat and the second stage of the thermostat operates the furnace on high heat. For example, a typical two-stage thermostat comprises two small mercury bulb contacts on a bi-metal sensor that close and open as a function of the movement of the bi-metal sensor in response to changing room temperatures. If the present room temperature is below a desired temperature set point, for example, one degree to two degrees below the set point, then the low mercury heat bulb contact closes to provide low heat. If the room temperature continues to drop to, for example, three degrees below the desired temperature set point, then the second mercury bulb contact closes to provide a high rate of heat. When the heating load is satisfied, both of the mercury bulb contacts in the thermostat will sequentially open or deactivate, thereby terminating the heating cycle. Thereafter, when the thermostat contacts close indicating a new heating load to be satisfied, the furnace control repeats the same identical heating cycle.

Disadvantages of the above type of furnace control include the requirement of a two-stage thermostat for providing dual rates of heat and the existence of large swings in room temperature.

In an earlier patent, U.S. Pat. No. 4,638,942 to Ballard et al., assigned to a common assignee, an adaptive microprocessor control system and method was taught which overcame the aforementioned disadvantages.

In addition to the benefits achieved by the Ballard et al. patent, however, it is desirable to have a furnace which recovers quickly from setback such as, in particular night-setback. It is also desirable to reduce off-cycle electrical power draw, which reduction can result in savings on the average cost of operation of the furnace.

SUMMARY OF THE INVENTION

It is an object of the present invention to provide an improved furnace control and method therefore.

It is another object of the present invention to provide a furnace control and method that utilizes a single stage thermostat for providing dual rates of heat.

It is still another object of the present invention to provide a furnace control and method that uses an adaptive furnace control scheme that satisfies a new heating load as a function of the last heating cycle performance.

A further object of the present invention is to provide a furnace control and method that consumes less energy, by providing a minimum amount of high heat and by reducing off-cycle electrical power draw.

It is yet another object of the present invention to provide a furnace control and method that allows faster recovery from setback conditions, particularly night setback.

It is still a further object of the present invention to provide a furnace control and method that is more compatible with zoning by increasing low fire mode run time and the speed of recovery from system changes.

These and other objects of the present invention are attained by a method for providing a low fire mode and a high fire mode of a heating cycle in a current cycle of a furnace as a function of the previous heating cycle wherein the current heating cycle is a function exclusively of time run in low fire mode and time run in high fire mode of the previous heating cycle, comprising the steps of (1) determining the existence of a heating load to be satisfied; (2) running burners in low fire mode for a first time interval that does not exceed a predetermined limit, $L_{des}$; (3) running the burners in high fire mode for a second time interval until the heating load is satisfied; (4) calculating a BtU load requirement, as a function of the first time interval and the second time interval; and (5) determining the desired low fire mode time limit, $L_{des}$, for the next cycle from the calculated BtU load requirement.

BRIEF DESCRIPTION OF THE DRAWINGS

The above-mentioned and other features and objects of this invention, and the manner of obtaining them, will be more apparent and the invention itself will be better understood by reference to the following description of three embodiments of the invention, taken in conjunction with the accompanying drawings, wherein:

FIG. 4A through FIG. 4C taken together comprise a flow diagram illustrating a second embodiment of the invention as applied to the heating cycle of a furnace control system.

FIG. 5A through FIG. 5D taken together comprise a flow diagram illustrating a third embodiment of the invention as applied to the heating cycle of a furnace control system.

DETAILED DESCRIPTION OF THE INVENTION

Figure 1:
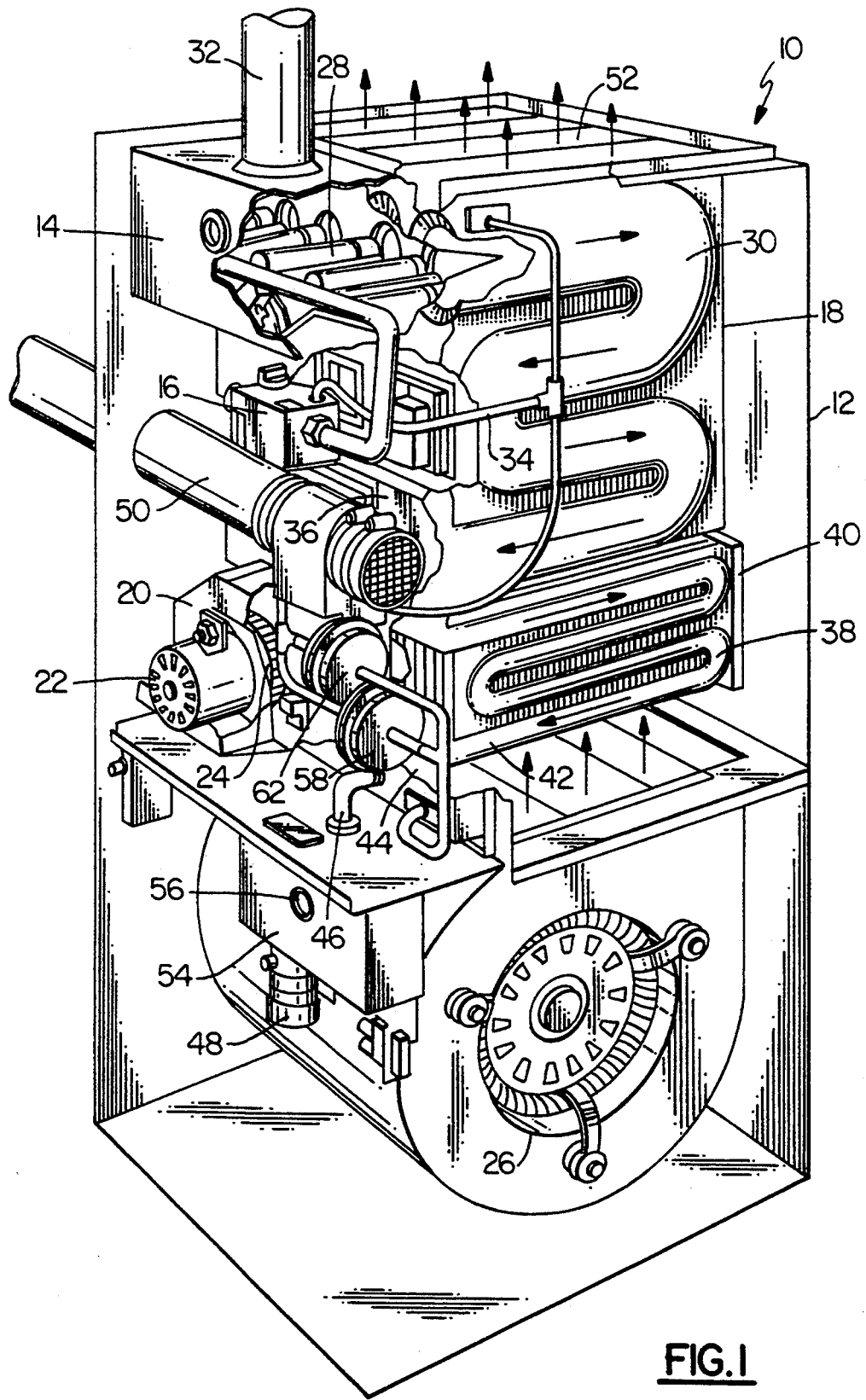
FIG. 1 is a partially broken-away side elevational view of a furnace incorporating the principles of the present invention.

Referring to FIG. 1, there is illustrated a gas-fired furnace which may be operated according to the principles of the present invention. The following description is made with reference to condensing furnace 10, but it should be understood that the present invention contemplates incorporation with a non-condensing type furnace, two speed cooling unit, two speed heat pump, electric furnace, or any other type of heating source. Referring now to FIG. 1, condensing furnace 10 includes in major part steel cabinet 12, housing therein burner assembly box 14, combination gas control 16, heat exchanger assembly 18, inducer housing 20 supporting inducer motor 22 and inducer wheel 24, and circulating air blower 26. Combination gas control 16 includes pilot circuitry for controlling and proving the pilot flame. This pilot circuitry or control can be a SCP, Inc. Model 740A pilot obtainable from UTEC, Huntington, Ind. Combination gas control 16 can provide dual rates of gas flow to burner assembly 14, a low gas flow rate and a high gas flow rate.

Burner assembly 14 includes at least one inshot burner 28 for at least one primary heat exchanger 30. Burner 28 receives a flow of combustible gas from combination gas control 16 and injects the fuel gas into primary heat exchanger 30. Part of the injection process includes drawing air into heat exchanger assembly 18 so that the fuel gas and air mixture may be combusted therein. A flow of combustion air is delivered through combustion air inlet 32 to be mixed with the gas delivered to burner assembly 14.

Primary heat exchanger 30 includes an outlet 34 opening into chamber 36. Connected to chamber 36 and in fluid communication therewith are four condensing heat exchangers 38, only one of which is shown, having an inlet 40 and an outlet 42. Outlet 42 opens into chamber 44 for venting exhaust flue gases and condensate.

Inducer housing 20 is connected to chamber 44 and has mounted therewith inducer motor 22 with inducer wheel 24 for drawing the combusted fuel air mixture from burner assembly 14 through heat exchanger assembly 18. Air blower 26 delivers the air to be heated upwardly through air passage 52 and over heat exchanger assembly 18, and the cool air passing over condensing heat exchangers 38 lowers the heat exchanger wall temperature below the dew point of the combusted fuel air mixture causing a portion of the water vapor in the combusted fuel air mixture to condense, thereby recovering a portion of the sensible and latent heat energy. The condensate formed within heat exchangers 38 flows through chamber 44 into drain tube 46 to condensate trap assembly 48. As air blower 26 continues to urge a flow of air to be heated upwardly through heat exchanger assembly 18, heat energy is transferred from the combusted fuel air mixture flowing through heat exchangers 30 and 38 to heat the air circulated by blower 26. Finally, the combusted fuel air mixture that flows through heat exchangers 30 and 38 exits through outlet 42 and is then delivered by inducer motor 22 through exhaust gas outlet 50 and thence to a vent pipe (not shown) Both inducer motor 22 and the motor (not shown) for air blower 26 are electronically commutated to provide variable speed operation.

Cabinet 12 also houses microprocessor control 54, LED display 56, low pressure switch 58, and high pressure switch 62. Switches 58 and 62 are plumbed in parallel such that each senses the differential pressure between chamber 44 and burner assembly box 14. Low pressure switch 58 closes as the pressure increases and will open when the pressure decreases below a first predetermined pressure. High pressure switch 62 operates similarly with respect to a second predetermined pressure that is greater than the first predetermined pressure.

Figure 2:
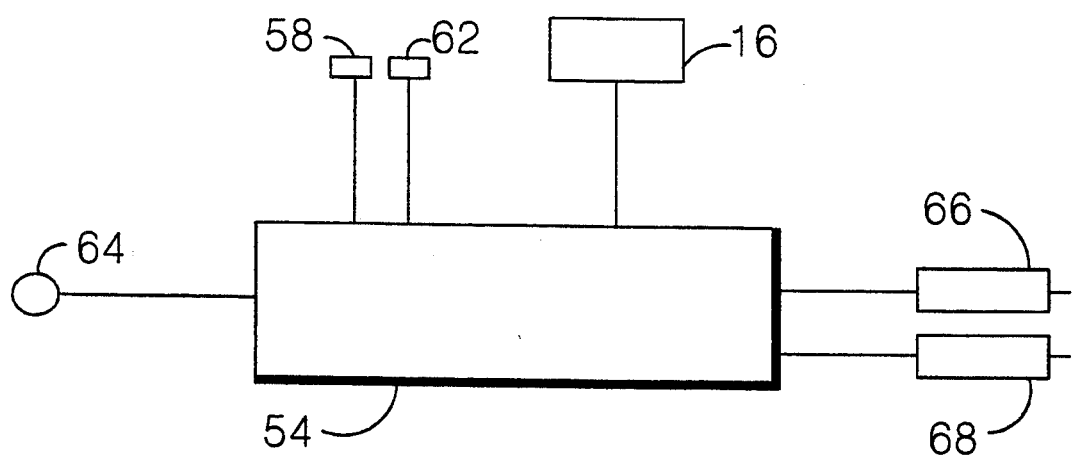
FIG. 2 is a block diagram of a portion of the furnace control system.

Referring to FIG. 2, there is illustrated a simplified block diagram showing the interconnection between microprocessor control 54 and pressure switches 58, 62, thermostat 64, gas valve 16, air blower motor control 66 for air blower 26, and inducer motor control 68 for motor 22. Both control 66 and 68 generate respective RPM pulse signals and contain respective optical couplers to isolate the respective RPM pulse output signal. Thermostat 64 is a single stage-type thermostat, i.e., has one mercury bulb contact.

The present invention provides an improved adaptive microprocessor control for furnishing a low heat mode and a high heat mode of a heating cycle in furnace 10 as a function of the previous heating cycle. In particular, the present invention allows faster recovery from night setback, and optimizes the low heat cycle as much as possible, with a maximum cycle length of 16 minutes of on-time. It also eliminates the need to keep track of the duration of the thermostat off-time, thus allowing the microprocessor to be in an idle state during such off-time, thereby reducing off-cycle electrical power draw by approximately ten watts, and reducing the average yearly operating cost of the furnace. In addition, this control system and method is more compatible with zoning due to increased low fire mode run time and faster recovery from system changes.

In the description that follows with reference to FIGS. 3A-3C, 4A-4C and 5A-5D, each of the steps can represent a subroutine or a series of steps in the heating cycle. Microprocessor control 54 has its control logic programmed to follow instructions given at each step. Control 54 is programmed to receive input, process the input, and generate output in response thereto.

Figure 3A:
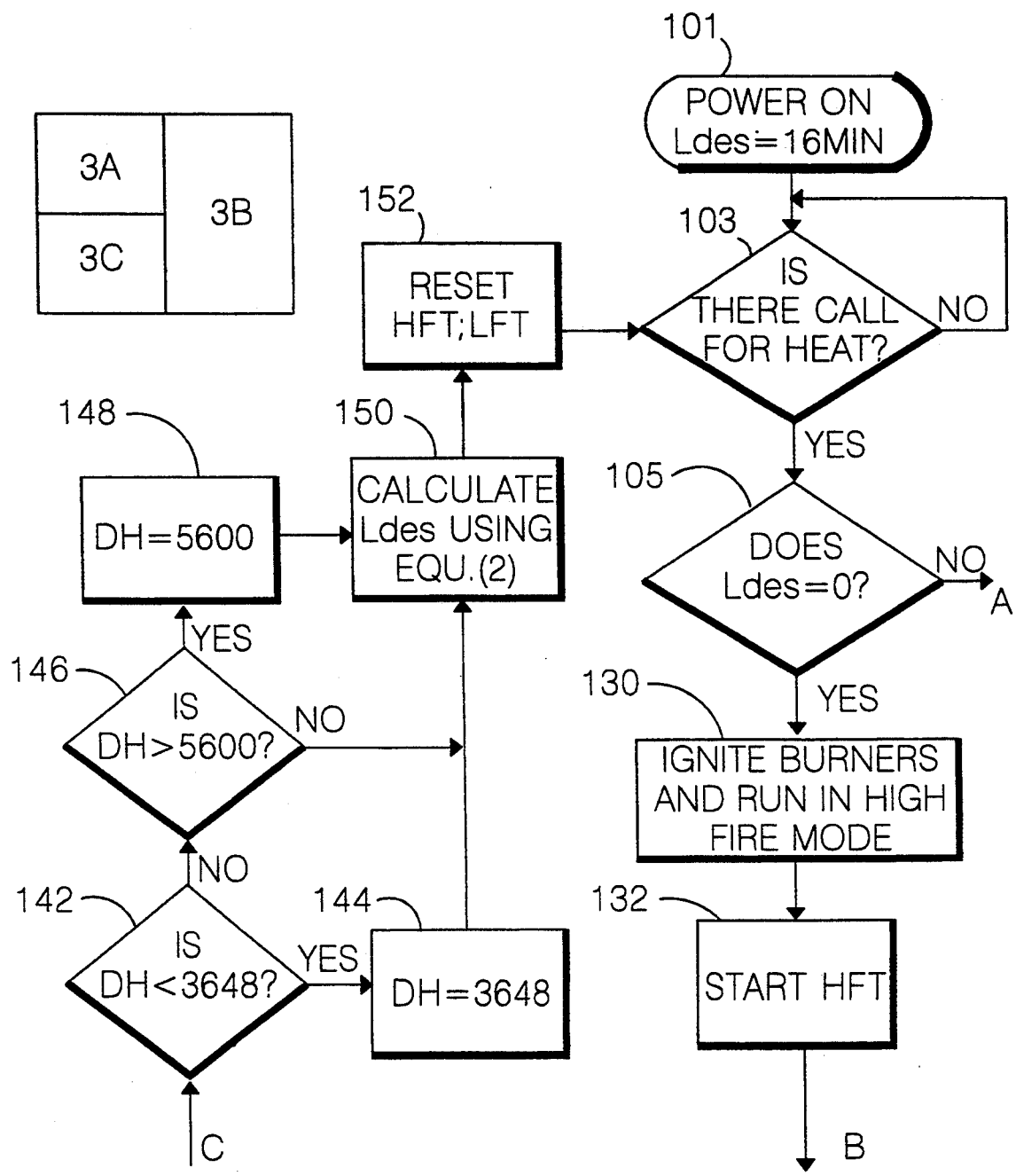
FIG. 3A through 3C taken together comprise is a flow diagram illustrating one embodiment of the invention as applied to the heating cycle of a furnace control system.
Figure 3B:
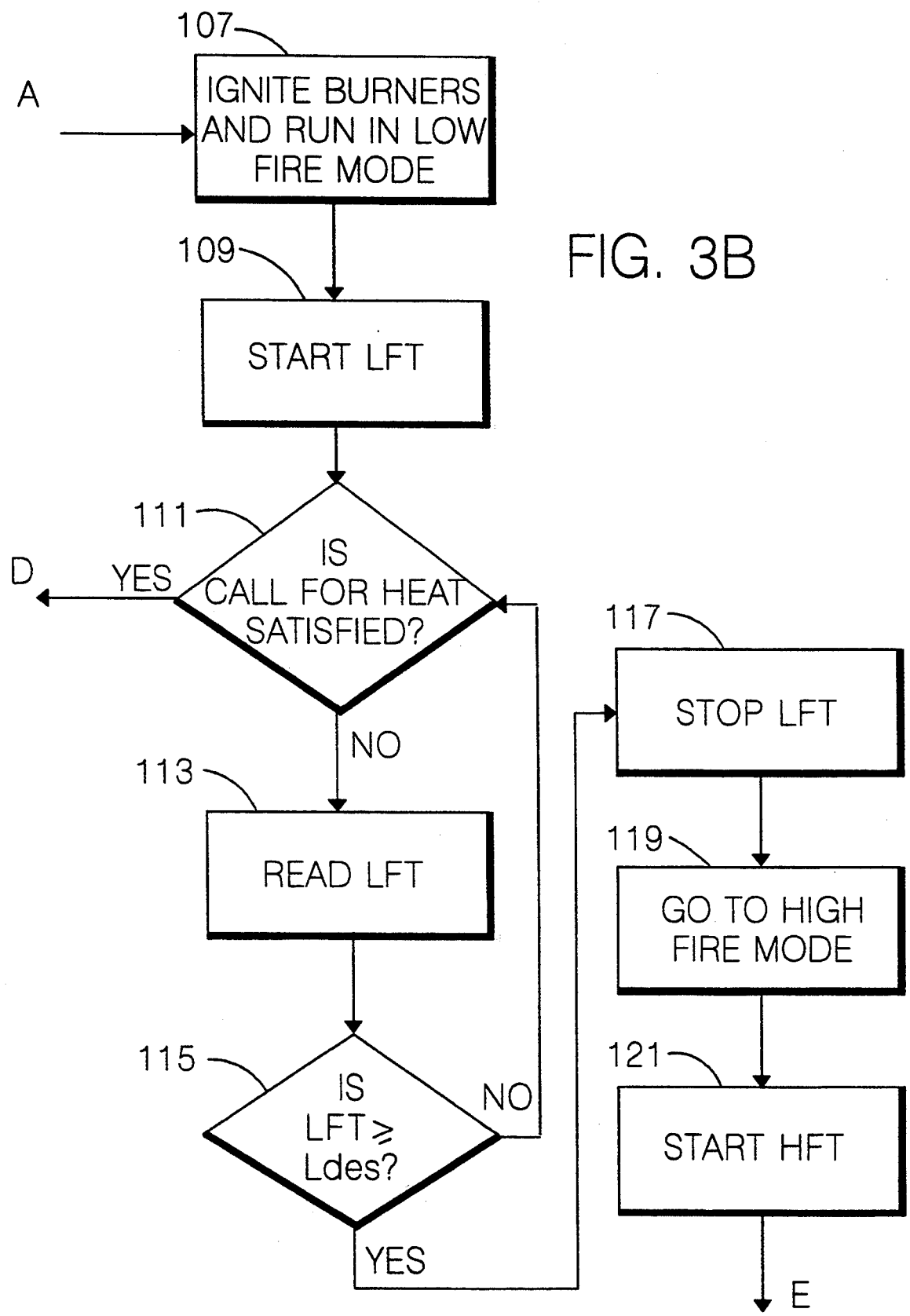
Figure 3C:
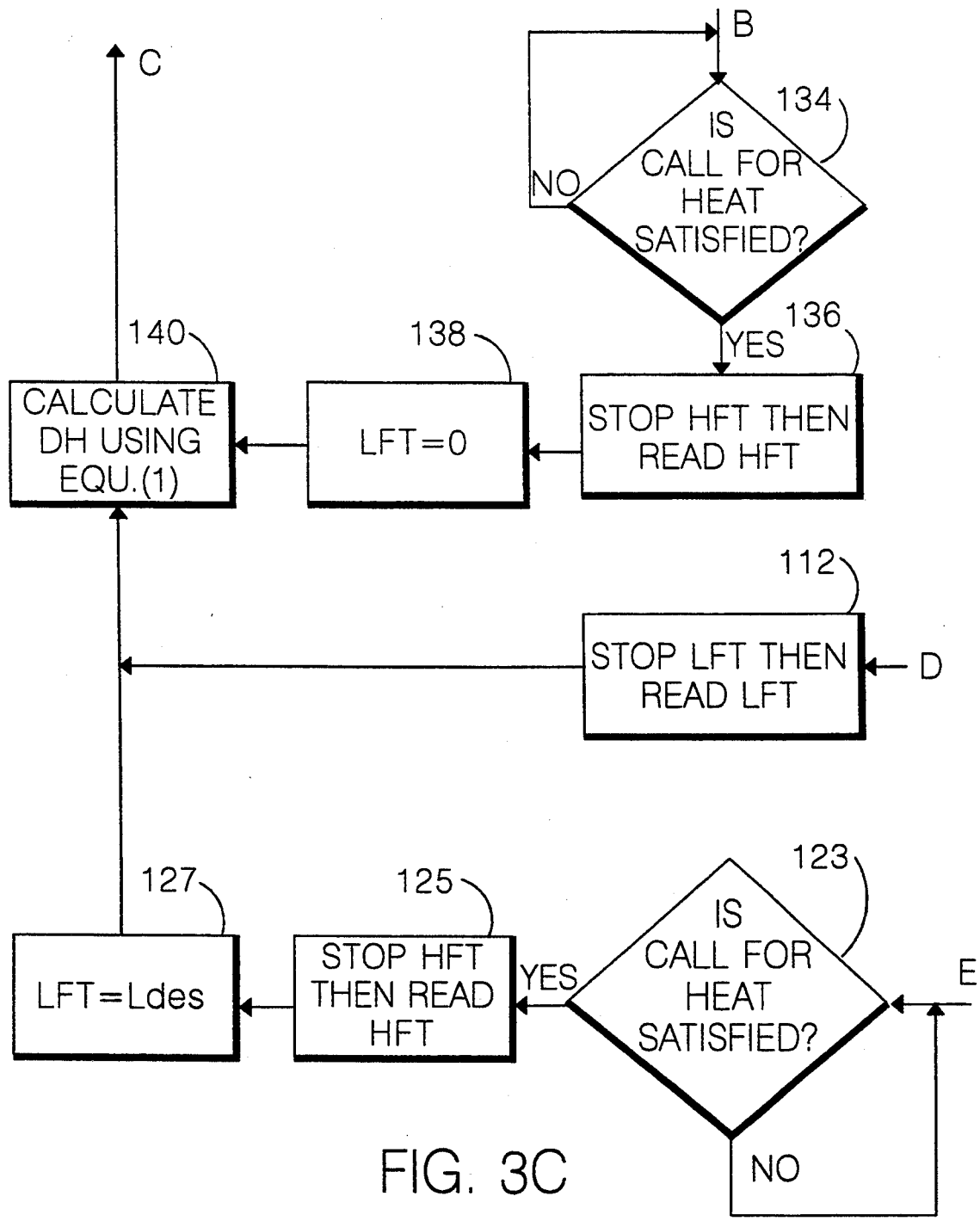

Referring now to FIG. 3A-3C which represents the preferred embodiment of the instant invention, step 101 represents the powering on of the furnace whereupon the value of $L_{des}$, in the initial cycle, is initialized to sixteen (16). The following step, 103 represents the thermostat 64 sensing whether or not there is a heating load to be satisfied. If there is such a load, the thermostat's single stage contact is closed and a signal is generated to the microprocessor control 54 indicating a need for heat. This test is performed repeatedly until such time as a call for heat is generated. When a call for heat is recognized, the system proceeds to step 105, and the microprocessor determines whether or not $L_{des}$ is equal to zero, which is equivalent to asking whether a period in low fire mode is required. In the initial cycle, $L_{des}$ will have been set to sixteen and so a low fire mode period will be ensured, beginning at step 107.

Similarly if, in subsequent cycles, a period of low fire mode is required, then in step 107, the burners 28 are ignited and run in low fire mode. The software then initiates the running of the low fire timer (LFT) at step 109. At the next step 111, the thermostat 64 is queried to determine whether or not the demand for heat is satisfied. If the demand for heat is not satisfied, then the low fire timer is read at step 113 and the software at step 115 determines whether or not LFT is greater than or equal to the desired low heat firing heat limit. If the value of LFT does not exceed or equal $L_{des}$, then the control system loops back to step 111.

On the other hand, if LFT is greater than or equal to $L_{des}$, then the low fire timer is stopped in step 117 and, in step 119, the burners 28 begin running in high fire mode. The high fire timer (read into variable HFT) is started at step 121 and, in the following step 123, thermostat 64 is repeatedly queried to see whether or not the heat demand is satisfied, until such time that it is satisfied. Thereupon, in step 125, the high fire timer is stopped and read, thereby obtaining the time interval measurement for high fire mode. In step 127, the value of $L_{des}$ is set to the previous value of the low fire timer. Calculations are then performed in step 140 as will be described hereinafter.

Returning now to step 111 at which the thermostat 64 is queried after running in low fire mode, if the heat demand is satisfied after the system has operated only in low fire mode, then in step 112 the low fire timer is stopped and read, and calculations are performed in step 140 as will be described hereinafter.

Returning now to step 105 wherein $L_{des}$ was tested to determine whether or not it was zero, if it is the case that $L_{des}$ is equal to zero, then no low fire mode run is desired and therefore in the following step 130, the burners are ignited and run in high fire mode; the high fire timer is then started in step 132. In the following step 134 the thermostat 64 is repeatedly queried to see if the heat requirement is satisfied. At the time that the heat requirement is satisfied, the high fire timer is stopped and read in step 136, LFT is seen to be zero in step 138, as no time was spent in low fire mode; calculations as indicated in step 140 are then performed.

In the first step of the calculation process, step 140, the Btu load requirement (DH) to satisfy a call for heat is calculated by the following equation:

$$DH = (228 \times LFT) + (350 \times HFT) \quad \text{Equation 1}$$

Where:
228 is the low fire output per cell in Btu/min.
350 is the high fire output per cell in Btu/min.
LFT is the low fire time interval in minutes during the previous cycle.
HFT is the high fire time interval in minutes during the previous cycle.

The following step, 142 queries whether the value DH is less than 3,648. If it is, then in step 144 DH is set to be equal to 3,648 and in the following step 150, $L_{des}$ is calculated as will be described below. If, on the other hand, step 142 determines that DH is greater than or equal to 3,648, then, in step 146, it is next determined whether the value of DH is greater than 5,600. If it is not, then in the next step 150, $L_{des}$ is calculated as will be described below. If on the other hand DH is greater than 5,600, then the value of DH is set to 5,600 at step 148, and then step 150 is performed.

At step 150, $L_{des}$ is calculated using the following equation:

$$L_{des} = (5600 - DH)/122 \quad \text{Equation 2}$$

The system then returns to step 103 wherein it cycles waiting for a call for heat from the thermostat 64. After the first cycle $L_{des}$ may be equal to zero in which case the next cycle is spent in high fire mode, or it may be greater than zero in which case the next cycle will run in low fire mode for the length of time indicated by $L_{des}$, with an additional high fire mode run if the thermostat 68 is not satisfied within the $L_{des}$ time.

Figure 4B:
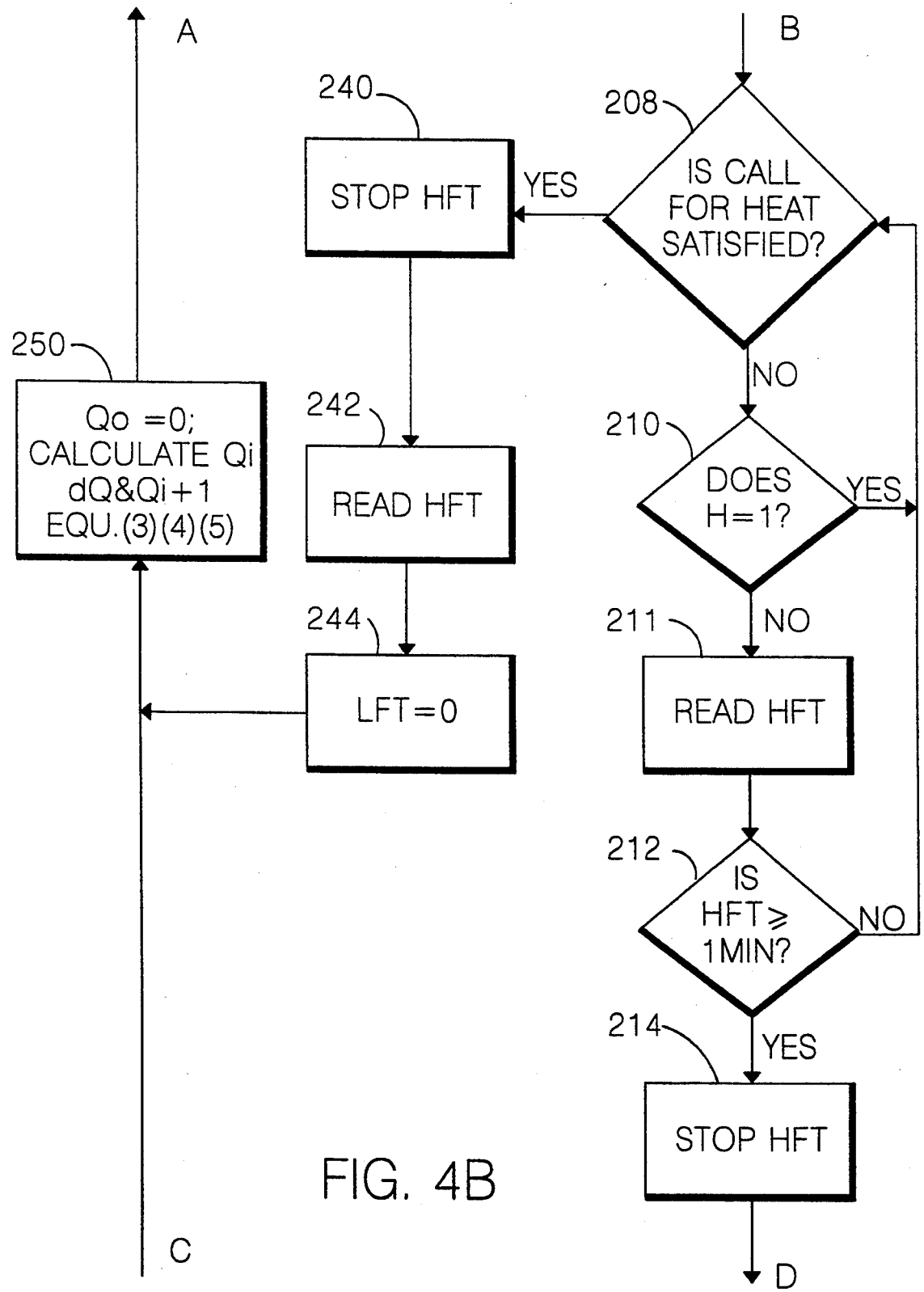
Figure 4C:
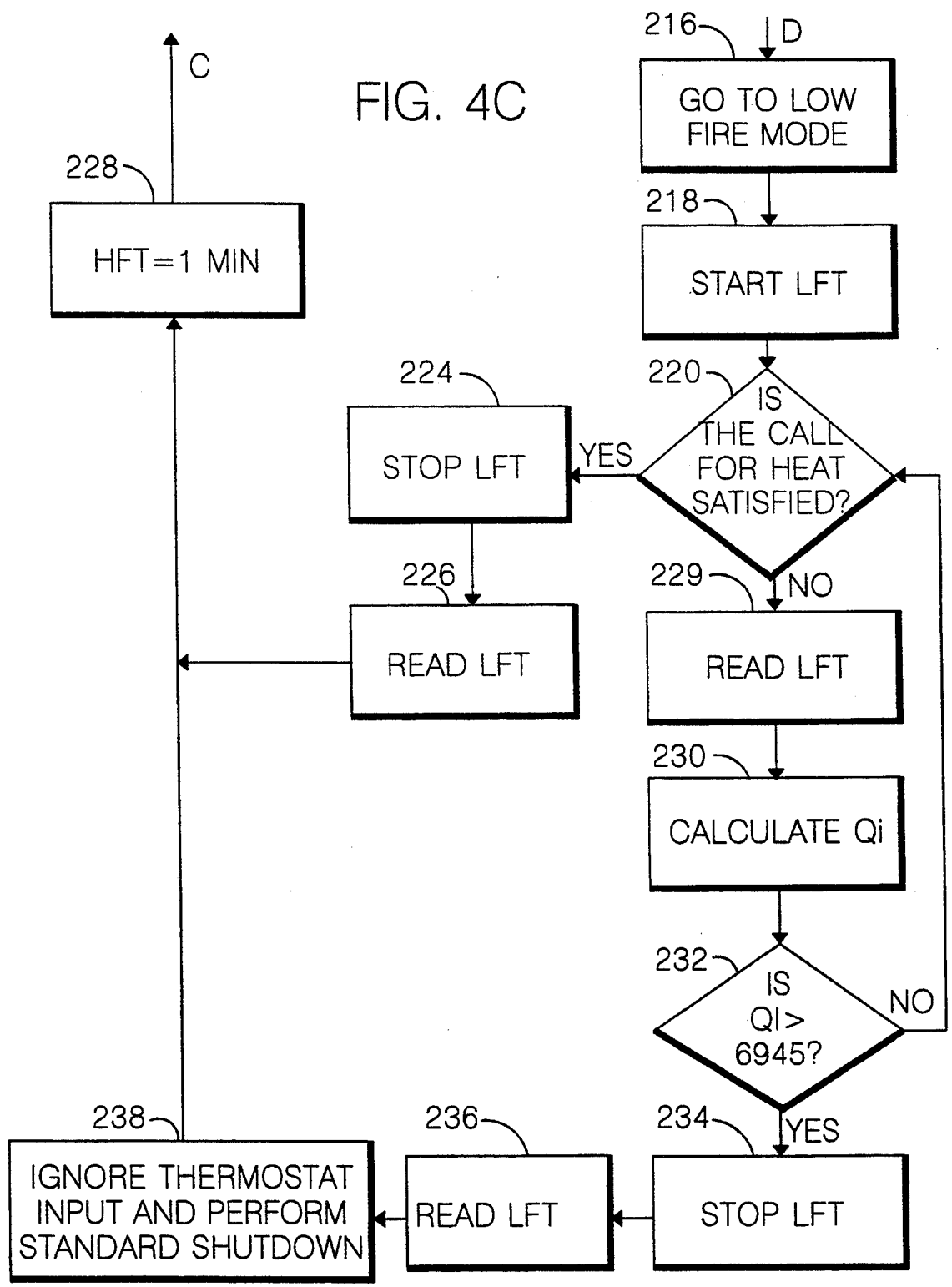
Figure 5B:
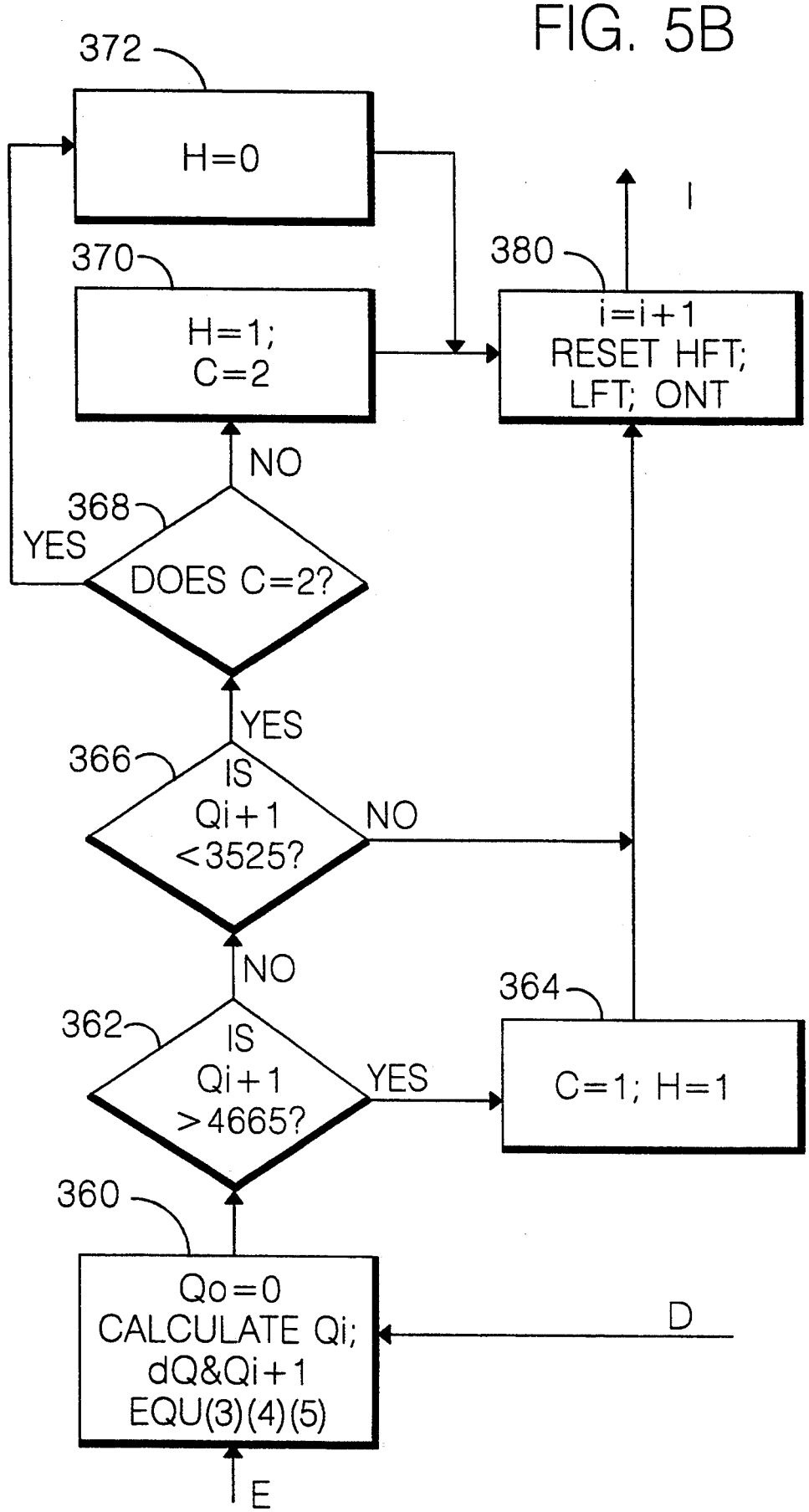
Figure 5C:
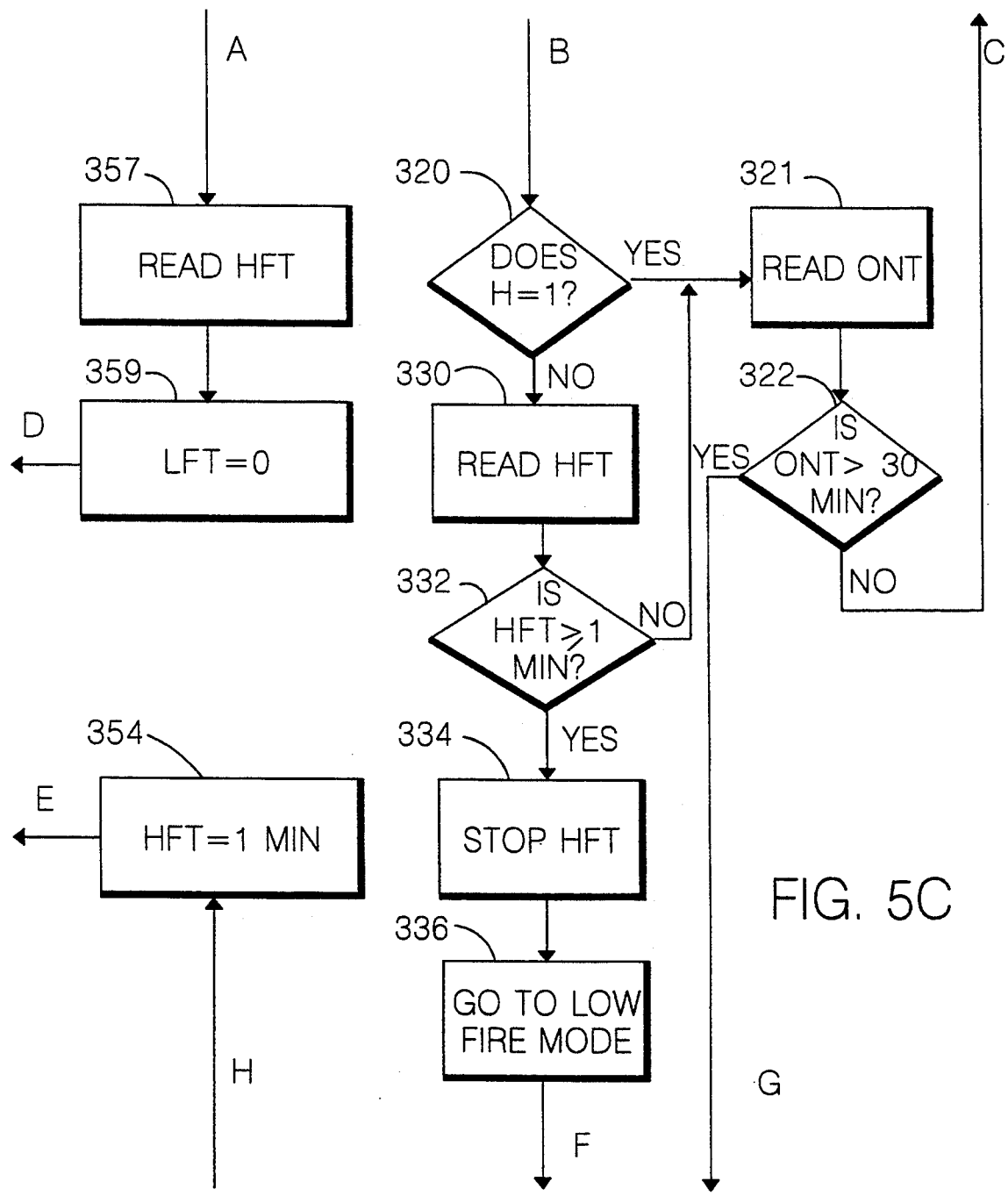
Figure 5D:
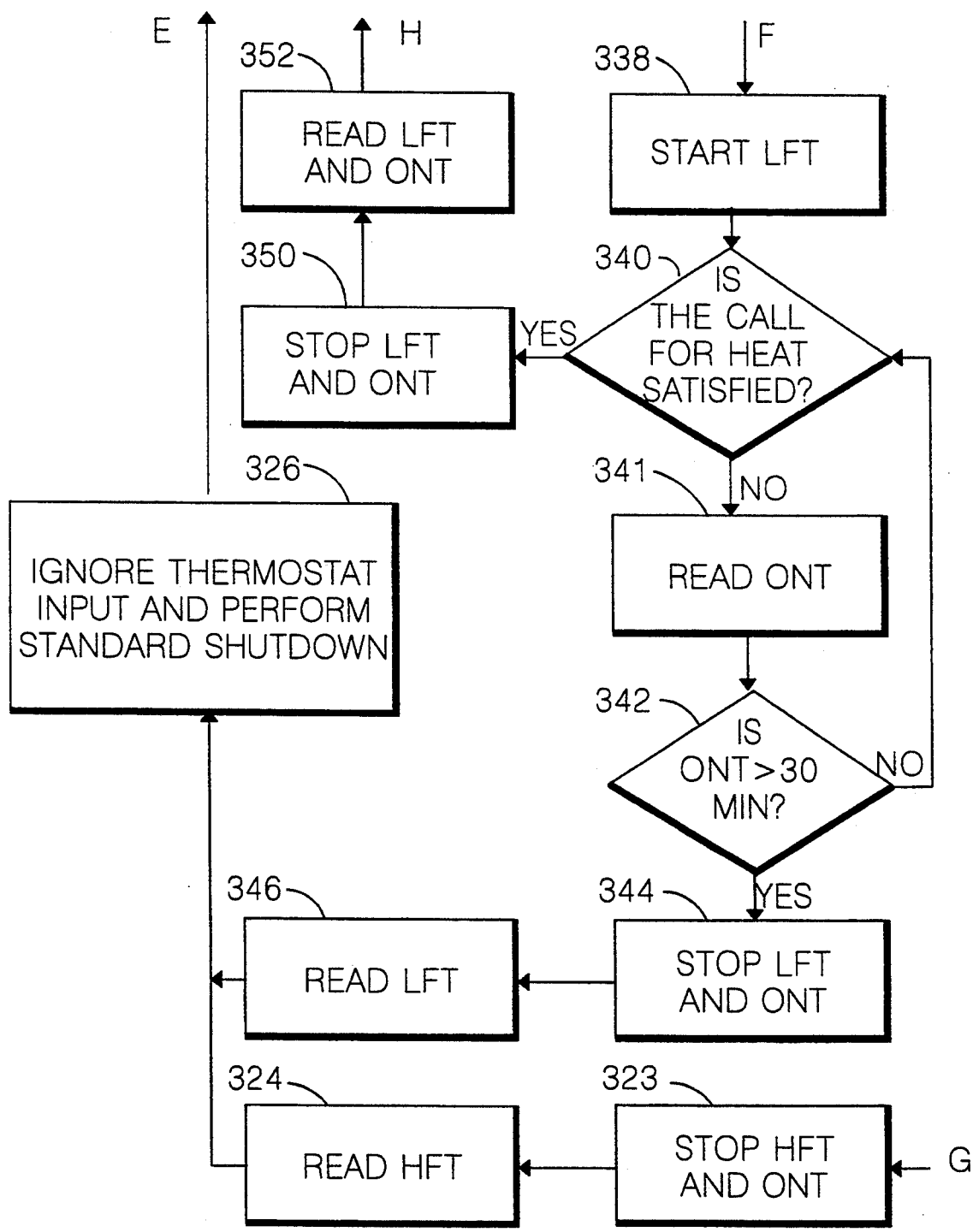

In a second embodiment, depicted in FIGS. 4A–4C, information is retained from at least two cycles in order to calculate the desired behavior on the following cycle. Using this system and method, the furnace system will be prevented from operating in low fire mode the first full cycle during night set-back when the unit was operating in high fire mode during the initiation of night set-back. It should be noted that for optimum performance of the system, it is important to properly select the room thermostat anticipator setting.

Each time the heating contacts of the room thermostat are closed, the system will come on for a one minute period of high heat to achieve proper burner light-off and to quickly warm up the heat exchangers. This is indicated in step 200 of FIG. 4a. At this time the cycle counter i, and flags H and C are each set to 1. Flag C reflects the number of cycles during which the Btu requirement load was below a predetermined lower value, here 3,525. The flag H tells the system whether or not to operate in low fire mode for the current cycle.

In the following step 202 thermostat 64 is repeatedly queried to determine whether a call for heat has been made. When such a call for heat is made, then, in the following step 204, the burners are ignited and they are run in high fire mode.

Thereafter, in step 206 the high fire timer is started. Next, in step 208, the thermostat 64 is queried to see if it is satisfied. If it is not satisfied, then in step 210, it is determined whether H is equal to one, meaning that there have not been two cycles in which the Btu load requirement, $Q_{i+1}$ was less than 3,525 Btu, as will be described hereinafter. If H does equal one, as it will in the first cycle, then step 208, i.e., the check to see whether thermostat 64 is satisfied, is performed again. If on the other hand, H does not equal one, then there has been two cycles in which $Q_{i+1}$ was less than 3,525 Btu. In that case, in step 211, HFT is read and, in step 212, the value of HFT is checked to see whether it is greater than or equal to one minute.

If HFT is less than one minute, then step 208 checking for the satisfaction of thermostat 64 is repeated. If, on the other hand, HFT is greater than or equal to one minute, then in step 214 the high fire timer is stopped. Thus the system always burns in high fire mode, for a maximum time interval of one minute, after a call for heat, in the instance where the value of H is zero.

In step 216 the burners go to low fire mode. In the following step 218, the low fire timer is started and in step 220 the thermostat 64 is again queried to see whether the heat requirement is satisfied.

If the heat requirement is satisfied, then the low fire timer is stopped in step 224 and read in step 226. The high fire timer value HFT will be at one minute, as indicated in step 228, because it was the existence of this condition in step 212 that resulted in the system's reaching this point. Calculations are then performed in step 250 as will be described hereinafter.

If, however, in step 220 the heat requirement is not satisfied, then, in step 229 the low fire timer is read, and in the following step 230, the Btu load requirement, $Q_1$ is calculated using Equation 3, which will be elaborated upon below. In the next step 232, a determination is made as to whether or not $Q_i$ is greater than a predetermined Btu load requirement, here, 6,945. If it is not, then the system returns to step 220 to determine whether or not thermostat 64 is satisfied. If, on the other hand, $Q_i$ is greater than 6,945, then it is possible that the unit will operate in a run away condition in low heat that will never satisfy the thermostat demand. Therefore, in step 234 the LFT timer will be stopped and LFT will be read in step 236. In the next step 238 the thermostat input will be ignored and a standard shut down of the furnace will be performed. The furnace will cycle on again in high fire mode after going through the blower off-delay sequence. The logic path for these events is that after the standard shut down of step 238 HFT will be one minute, as indicated in step 228, and discussed above. Thereafter step 250 is performed in order to accomplish various calculations as will be described below.

Returning now to step 208, if the thermostat is satisfied after its initial start in high heat, then in step 240 the HFT counter is stopped, in step 242 the high fire timer value is read into variable HFT. Step 244 indicates that, under these circumstances, LFT will have a value of zero, as a run in low fire mode was not needed. Thereafter, the calculations of step 250 are performed.

In the calculation step 250, $Q_0$ is set to have the value of zero and $Q_i$, $dQ$ and $Q_{i+1}$ are calculated as follows:

$$Q_i = (350 \times HFT) + (228 \times LFT) \quad \text{Equation 3}$$

where:
228 is the low fire output per cell in BtU/min.
350 is the high fire output per cell in BtU/min.
LFT is the low fire time interval in minutes during the previous cycle.
HFT is the high fire time interval in minutes during the previous cycle.

$$dQ = Q_i - Q_{(i-1)} \quad \text{Equation 4}$$

where:
dQ is the change in BtU load requirement.
$Q_{(i+1)}$ is calculated as follows:

$$Q_{(i+1)} = Q_i + dQ \quad \text{Equation 5}$$

After these initial calculations, step 252 is performed wherein it is determined whether $Q_{i+1}$ is greater than a predetermined upper value, here 4,665. If $Q_{i+1}$ is greater than 4,665, then the values of C and H are both set to one in step 262, in which case the system will run exclusively in high fire mode for at least the next two cycles. Next, in step 264, i is incremented to i+1, the two timers, HFT and LFT are reset to zero, indicating a new cycle, and the system returns to step 202 in which the existence of a call for heat from the thermostat 68 is determined.

If $Q_{i+1}$ is not greater than 4,665, then in step 254, a determination is made as to whether $Q_{(i+1)}$ is less than 3,525. If it is not less than 3,525, then the cycle counter i is incremented to i+1 at step 264 and the timers reset; the system then begins its next cycle with a wait for a call for heat at step 202. Thus, as was just seen, if the value of $Q_{(i+1)}$ is greater than 4,665, H is set to one and the next cycle will see only high heat. On the other hand, if $Q_{(i+1)}$ is between 4,665 and 3,525, the next cycle will run at the same firing rate as the cycle just completed, but H will not be set to one (although if already set to one it will remain so).

If $Q_{(i+1)}$ is less than 3,525, then, in step 256, the value of C is compared with the number two. If C does not equal two, then H is set to one and C is set to two in step 258; the value of i is incremented to i+1 in step 264, the timers reset and the next cycle begins at step 202. If, on the other hand C does equal two, then H is set to zero in step 260 the counter is incremented and timers reset in step 264, and the next cycle begins with step 202. Thus, only when the value of $Q_{(i+1)}$ has been below 3,525 for two cycles, without exceeding 4,665 in an intervening cycle, will the system be allowed to run in low fire mode on the third cycle. The purpose of this restriction is to prevent the system from operating in low fire mode during the first full cycle of set-back when the unit was operating in high fire mode during the initiation of set-back.

In summary, according to this second embodiment, when the heating contacts of the room thermostat are closed, the system will come on for a one minute period of high heat to achieve proper burner light-off to quickly warm up the heat exchangers. At the end of the one minute period, the system will run at low heat until the heat demand is satisfied. A low heat run will only take place when $Q_{(i+1)}$ has been below 3,525 BtU for two cycles without an intervening cycle in which it has been above 4,665.

Once the furnace begins running in low fire mode, it will do so with each consecutive cycle unless $Q_{(i+1)}$ exceeds 4,665 BtU.

A third embodiment of the instant invention is shown in FIGS. 5A-5D. The system is initially powered on in step 300 and the values of H, C, and i are all set to one. In step 302, thermostat 64 is repeatedly queried to determine when a call for heat is made. When a call for heat is detected, the thermostat on-time timer (ONT) is started in step 304, burners are ignited, with the system running in high fire mode in step 306, and the high fire timer (HFT) started in step 308.

Thermostat 64 is queried in step 310 to determine whether the heat requirement is satisfied. If it is not satisfied, then in step 320 a determination is made as to whether the value of H is one. If the value of H is one, then, ONT is read in step 321, followed by step 322, determining whether the value of ONT is greater than a predetermined time which, in this case, is 30 minutes. If it is not, the system returns to step 310, and its determination of whether the heat requirement is satisfied. If, however, the value of ONT is greater than 30, then the high fire timer and on-time timer are both stopped in step 323 and read in step 324. Next, in step 326 the thermostat input is ignored and a standard shut down is performed. Following this, the calculations of step 360 are performed.

Returning to step 320, if H does not equal one, then in step 330, HFT is read, and in step 332, its value is compared to see whether it is greater than or equal to one. If it is not, then the system returns to step 321, testing the value of ONT.

If, however, in step 332 it is determined that HFT is greater than or equal to one, then the high fire timer is stopped in step 334, the system goes to low fire mode in step 336, and the low fire timer (LFT) is started in step 338. In the next step 340, the thermostat 64 is queried to see whether the heat requirement is satisfied.

If the heat requirement is not satisfied, then the ONT is read in step 341 and in step 342 it is determined whether ONT is greater than thirty minutes. If it is not, then the system returns to step 340 where it queries whether the thermostat is satisfied.

Otherwise, if ONT is greater than thirty minutes then the low fire timer and on time timer are both stopped in step 344, LFT is read in step 346 and the system proceeds to step 326 where standard shut down is performed.

Returning now to step 340, where thermostat 64 is queried to determine if the heat requirement is satisfied, if it is, then in step 350, the low fire timer and on time timer are stopped, and read in step 352. The value of HFT will be one minute, as seen in step 354, because the test of step 332 was passed. The system next proceeds to step 360 where calculations are performed.

Returning now to step 310, if the thermostat is satisfied in step 310, then in step 355, the high fire timer and on time timer are turned off, and HFT is read in step 357. In the following step, 359, the value of LFT is noted to be zero, because this step was arrived at without there having been any time spent in low fire mode. Next, the calculations in step 360 are performed.

In step 360 the values of $Q_0$ is set to zero and the values of $Q_i$, dQ, and $Q_{(i+1)}$ are calculated using equations 3, 4 and 5, respectively.

After these initial calculations, step 362 is performed wherein it is determined whether $Q_{i+1}$ is greater than 4,665. If $Q_{i+1}$ is greater than 4,665, then the values of C and H are both set to one in step 364, in which case the system will run exclusively in high fire mode for at least the next two cycles. Next, in step 380, i is set to i+1 indicating a new cycle, and the timers are reset. The system then returns to step 302 and the determination of whether or not there is a call for heat from the thermostat 68.

If $Q_{i+1}$ is not greater than 4,665, then in step 366, $Q_{(i+1)}$ is tested to determine if it is less than 3,525. If it is not less than 3,525, then the cycle counter i is incremented to i+1, and the counters reset at step 380, and the system begins its next cycle waiting for a call for heat at step 302.

Thus, as was just seen, if the value of $Q_{(i+1)}$ is greater than 4,665, H is set to one and the next cycle will see only high heat. On the other hand, if $Q_{(i+1)}$ is between 4,665 and 3,525, the next cycle will run at the same firing rate as the cycle just completed, but H will not be reset to one (although if already set to one, it will remain so.)

If $Q_{(i+1)}$ is less than 3,525 then, in step 368, the value of C is compared with the number two, to determine if this is the second cycle less than a $Q_{(i+1)}$ value of 3,525 BtU. If C does not equal two, then H is set to one and C is set to two in step 370, i is incremented to (i+1) and the counters reset in step 380, and the next cycle will begin, with no possibility of running in low fire mode. If, on the other hand C does equal two, then H is set to zero in step 372, the counters are reset and i is incremented in step 380 and the next cycle begins with step 302. Because the value of H is now zero the system will run in low heat.

Thus, only when the value of $Q_{(i+1)}$ has been below 3,525 for two cycles will the system be allowed to run in low fire mode on the third cycle. The purpose of this restriction is to prevent the system from operating in low fire mode during the first full cycle of set-back when the unit was operating in high fire mode during the initiation of set-back.

While this invention has been explained with reference to the structure disclosed herein, it is not confined to the details set forth and this invention is intended to cover any modifications and changes as may come within the scope of the following claims.

What is claimed is:

1. A method for providing a low fire mode and a high fire mode of a heating cycle in a current cycle of a furnace as a function of the previous heating cycle wherein the current heating cycle is a function exclusively of time run in the low fire mode and time run in the high fire mode of said previous heating cycle, comprising the steps of:
   determining an existence of a heating load to be satisfied;
   running burners in said low fire mode for a first time interval that does not exceed a predetermined limit, $L_{des}$;
   running the burners in said high fire mode for a second time interval until the heating load is satisfied;
   calculating a Btu load requirement, as a function of said first time interval and said second time interval; and
   predetermining the low fire mode time limit, $L_{des}$, for a next cycle from the calculated Btu load requirement.

2. The method of claim 1, further comprising the steps of:
   determining if the heating load is satisfied while the burners are operating in low fire mode;
   if the heating load is satisfied, terminating the low fire mode; and
   if the heating load is satisfied in low fire mode, aborting initiation of operation in high fire mode.

3. The method of claim 1 where determining the existence of a heating load to be satisfied is performed by a single-stage thermostat.

4. The method of claim 1 where the Btu load requirement (DH) to satisfy a call for heat is calculated as:

$$DH = (228 \times LFT) + (350 \times HFT)$$

where:
228 represents low fire output per cell in Btu/min,
333 represents high fire output per cell in Btu/min,
LFT is the first time interval, in minutes, and HFT is the second interval, in minutes, and $$L_{des} = (5600 - DH)/122.$$

5. A method for providing a low fire mode and a high fire mode of a heating cycle in a furnace as a function of previous heating cycles comprising the steps of:
   determining the existence of a heating load to be satisfied;
   running burners in the high fire mode only for at least two cycles;
   determining from the heating load of at least two previous cycles, whether the burners should be run in low fire mode for each subsequent cycle; and
   running the burners in low fire mode if it is determined that said burners should run in low fire mode.

6. The method of claim 5 further comprising, after determining the existence of a heating load to be satisfied, the steps of:
   initiating the burners in high fire mode;
   providing the high fire mode for a predetermined period of time;
   terminating the high fire mode if the heating load is satisfied during the predetermined period of time.

7. The method of claim 6 wherein the predetermined period of time is one minute.

8. The method of claim 5 wherein, if running the burners in low fire mode does not satisfy the heating load prior to having a first Btu load requirement reach a predetermined figure, the furnace is subjected to a shutdown and restart procedure.

9. The method of claim 8 wherein said predetermined figure for said first Btu load requirement is 6,945 Btu.

10. The method of claim 5 wherein the burners are run in low fire mode upon meeting a second Btu load requirement wherein:
    an actual Btu load requirement has been below a lower predetermined Btu load requirement for at least a first and a second cycle; and
    the actual Btu load requirement has remained below an upper predetermined Btu load requirement for all cycles between said first cycle and said second cycle; and
    the actual Btu load requirement has remained below said upper predetermined Btu load requirement for all cycles subsequent to said second cycle.

11. The method of claim 10 wherein said lower predetermined Btu load requirement is 3,525 Btu and said upper predetermined Btu load requirement is 4,665 Btu.

12. The method of claim 5 wherein the actual Btu load requirement for a current cycle ($Q_{(i+1)}$), is calculated as: $Q_{(i+1)} = Q_i + dQ$; where:

$$Q_i = (350 \times HFT) + (228 \times LFT);$$

where:
  228 represents low fire output per cell in BtU/min,
  350 represents high fire output per cell in BtU/min,
  LFT is a time interval in minutes, spent in low fire mode during a most recent cycle, HFT is a time interval in minutes, spent in high fire mode during the most recent cycle; and $$dQ = Q_i - Q_{(i-1)}$$

where dQ is a change in BtU load requirement from a next most recent cycle to the most recent cycle.

13. The method of claim 5 wherein, if running the burners does not satisfy the heating load prior to a predetermined elapsed time, the furnace is subjected to a shutdown and restart procedure.

14. The method of claim 13 wherein said predetermined elapsed time is 30 minutes.

* * * * *